(12) United States Patent
Naghi et al.

(10) Patent No.: US 6,196,898 B1
(45) Date of Patent: Mar. 6, 2001

(54) METHOD FOR CLEANING A COMPUTER MOUSE DEVICE

(75) Inventors: David Naghi; Herschel Naghi, both of Los Angeles, CA (US)

(73) Assignee: Technology Creations, Inc., Los Angelo, CA (US)

( * ) Notice: Subject to any disclaimer, the term of this patent is extended or adjusted under 35 U.S.C. 154(b) by 0 days.

(21) Appl. No.: 09/496,209

(22) Filed: Feb. 2, 2000

Related U.S. Application Data

(62) Division of application No. 09/081,163, filed on May 18, 1998.

(51) Int. Cl.[7] ....................................................... B24B 1/00
(52) U.S. Cl. .............................. 451/28; 451/523; 451/524
(58) Field of Search ...................... 15/104.001, 104.03, 15/104.05, 104.16, 104.165, 104.2, 105, 106, 114, 118, 160, 164, 210.1, 211; 451/28, 523, 524, 525

(56) References Cited

U.S. PATENT DOCUMENTS

| D. 424,044 | * | 5/2000 | Wong et al. | D14/117.2 |
|---|---|---|---|---|
| 5,418,999 | * | 5/1995 | Smith | 15/106 |
| 5,970,559 | * | 10/1999 | Christy | 15/106 |

* cited by examiner

Primary Examiner—Derris H. Banks
(74) Attorney, Agent, or Firm—Lyon & Lyon LLP

(57) ABSTRACT

A computer mouse device cleaner uses a cleaning surface that has a diameter that is approximately the same as or larger than the diameter of a mouse ball. The cleaning surface is made of a hook material or an abrasive, absorbent material, and both materials can be used as two cleaning surfaces in a single device or kit. A curved ball cleaning surface made of an abrasive, absorbent material can also be included at an end of the handle of the cleaning device. In use, the cleaning surface is placed into the interior ball cavity of the mouse and rotated to cause the interior mouse rollers to roll. If a liquid cleaning solvent is applied to the hook material, it can be used to clean the mouse rollers and then removed by subsequent use of the abrasive, absorbent material.

14 Claims, 1 Drawing Sheet

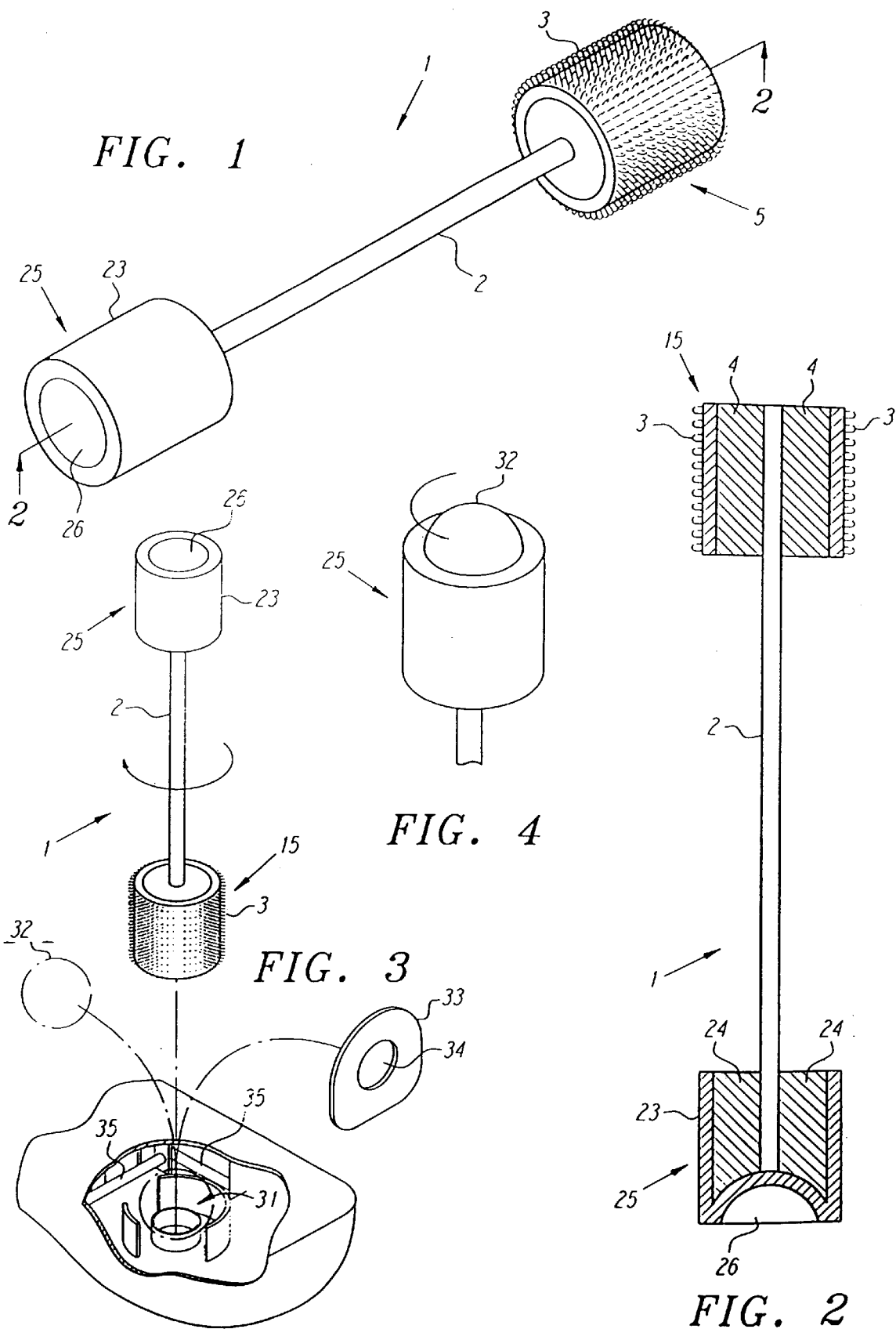

METHOD FOR CLEANING A COMPUTER MOUSE DEVICE

This is a divisional application of U.S. patent application Ser. No. 09/081,163 filed May 18, 1998.

FIELD OF THE INVENTION

The present invention is in the field of a computer mouse device cleaner.

BACKGROUND OF THE INVENTION

A computer mouse device is an accessory that is commonly used as a companion to a computer keyboard. The mouse has a mouse ball that is located in an interior ball cavity. The mouse ball is held loosely inside of the interior ball cavity by a removable cover that has an opening with a smaller diameter than the mouse and extends outwardly through the cover opening when the mouse is positioned ball side down. In use, movement of the mouse across a mouse pad or other flat surface causes the mouse ball to roll inside of the interior ball cavity, thereby causing mouse contact rollers inside of the mouse to roll. The movement of the mouse contact rollers is then translated into instructions that ultimately cause a cursor on a connected computer screen to move in response to movement of the mouse ball across the mouse pad.

Over time, the mouse ball can become dirty, or even sticky. In addition, dust, hair and other contaminants can get inside of the mouse through the opening in the removable cover and stick on the mouse contact rollers or mechanical parts. When either of these things happen, the ability of the mouse to properly function will be impaired, or the mouse may even cease functioning. To remedy such a situation, the mouse cover must be removed and the parts of the mouse must be cleaned.

At present, there is no inexpensive, easy way to clean a dirty mouse device. If the cover is removed, the mouse ball can easily be removed. However, if the mouse ball or the inside of the mouse are not properly cleaned, the mouse may still not function properly even after it is cleaned. This can cause frustration by users, or even result in discarding a dirty mouse in favor of a new, clean mouse.

One cleaning kit that is presently being sold for cleaning mouse devices is called Mouse Doctor™. This kit instructs its user to first remove the ball from the mouse device. Next, compressed air is sprayed into the interior cavity to remove dust particles. Next, cleaning pads and cleaning swabs are used to wipe the mouse contact rollers clean and the ball is replaced for operation. If the mouse contact rollers have a heavy build-up of grime, the user is instructed to saturate the swab with isopropyl alcohol before scrubbing the rollers. However, this cleaning kit is relatively expensive, and the cleaning process is cumbersome.

Accordingly, there is a need for an inexpensive, simple, easy to use cleaning kit that can be used to clean computer mouse devices and thereby increase their performance.

SUMMARY OF THE INVENTION

The present invention is generally directed to an improved computer mouse device cleaner and a method for using the cleaner.

In a first, separate aspect of the present invention, a computer mouse cleaner utilizes a handle with a cleaning surface attached to one end of the handle. The cleaning surface can be made of a hook material. The cleaning surface can also be made of an abrasive, absorbent material that does not leave lint or a residue on any surface being cleaned. The cleaning surface is sized so as to fit into the interior ball cavity of the mouse device such that rotation of the handle relative to one or more interior mouse contact rollers will cause at least one interior mouse contact roller to roll and thereby be cleaned by the cleaning surface. It is preferred that the cleaning surface has a diameter that is approximately the same as or larger than the diameter of the mouse ball. A compressible material can be located between the handle and the cleaning surface, and the cleaning surface can be detachable from the handle.

In another, separate aspect of the present invention, a ball cleaning surface made of an abrasive, absorbent material can be attached to the end of the handle. The ball cleaning surface should not leave lint or a residue on the surface of the ball. The ball cleaning surface is preferably curved or nested and shaped so as to provide a greater area of contact between the ball and the ball cleaning surface than would be possible if the ball cleaning surface was flat. A generally hemispherical shape is especially preferred for the ball cleaning surface.

In still another, separate aspect of the present invention, multiple cleaning functions can be combined in a single device or in a kit. Two cleaning surfaces can be combined on a single handle, and the ball cleaning surface can also be included at one end of the handle. When two cleaning surfaces are combined, one surface should be a hook material whereas the other surface should be an abrasive, absorbent material. Alternatively, the ball cleaning surfaces can be detachable.

In yet another, separate aspect of the present invention, several methods are provided for using a computer mouse cleaner or cleaning kit of the present invention. Once the computer mouse ball is removed from the interior ball cavity, the cleaning surface (either the hook material or the abrasive, absorbent material) is inserted into the interior ball cavity and rotated so as to cause one or more of the mouse contact rollers to roll and thereby be cleaned by the cleaning surface. It is especially preferred that the hook material be inserted into ball cavity, followed by the abrasive, absorbent material. Also, a cleaning solvent can be placed on the hook material, and then an abrasive, absorbent material can be used to absorb the solvent from the mouse contact rollers. In addition, the ball can be cleaned by a curved ball cleaning surface made of an abrasive, absorbent material, and then reinserted into the ball cavity.

Accordingly, it is primary object of the present invention to provide an improved computer mouse device cleaner and a method for cleaning the same.

This and further objects and advantages will be apparent to those skilled in the art in connection with the drawings and the detailed description of the preferred embodiments set forth below.

BRIEF DESCRIPTION OF THE DRAWINGS

FIG. 1 is a drawing of a preferred embodiment of a computer mouse device cleaner made in accordance with the present invention.

FIG. 2 is a cross-sectional view of FIG. 1.

FIG. 3 is a representation of the use of the preferred embodiment shown in FIG. 1 with a generic computer mouse device viewed from its underneath side with its ball and ball cover removed.

FIG. 4 presentation of the use of the preferred embodiment shown in FIG. 1 to clean a mouse ball.

DETAILED DESCRIPTION OF THE PREFERRED EMBODIMENTS

In the preferred embodiment of the present invention shown in FIG. 1, a computer mouse cleaner, generally designated as 1, has a handle 2, a first cleaning surface 3 attached to a first end 5 of the handle 2, a second cleaning surface 23 attached to a second end 25 of the handle 2, and a ball cleaning surface 26 attached to the second end 25 of the handle 4. The handle 2 is sized and shaped so as to allow a person to hold the handle and rotate the mouse cleaner. As shown in FIG. 2, a compressible material 4 is located between the handle 2 and the first cleaning surface 3 while a compressible material 24 is located between the handle 2 and the second cleaning surface 23. The ball cleaning surface 26 has a curved surface that is nested at the second end 25 of the handle 2; in other words, the cleaning surface extends beyond the second end 25 of the handle 2 such that the actual cleaning surface is generally in the shape of a bowl or a hemisphere that is attached to the handle 4. Either or both of cleaning surfaces 3 and 23 can be detachable from the handle 2.

If the cleaning surfaces 3 and 23 are detachable, they can be included in a kit. One simple and inexpensive way to manufacture a cleaner using detachable cleaning surfaces is to affix the cleaning surfaces on top of a portion of the handle (not shown) that is then connected to a base of the handle by a snap fit, a friction fit or some other means of connection. Conceptually, this would be similar to applying the cleaning surfaces to caps that could be snapped onto a highlighting marker or pen, for example. If a compressible material is to be used, the compressible material could be affixed or laminated to the portion of the handle first, and then the cleaning surfaces could be affixed on top of the compressible material.

Although the preferred embodiment is shown as having the cleaning surfaces 3 and 23 attached to a single handle 2, this is not required. Each could be attached to a single handle, either permanently or detachably. Also, it is not required that the ball cleaning surface 26 be attached to the second end 25 or be in contact with the second cleaning surface 23. It too could be its own product or device, attached to its own handle, either permanently or detachably.

The cleaning surfaces 3 and 23 should be sized so as to fit into an interior ball cavity of a mouse device such that rotation of the handle 2 relative to one or more interior mouse contact rollers 35 will cause at least one interior mouse contact roller to roll and thereby be cleaned by the cleaning surface. The cleaning surfaces 3 and 23 can be cylindrical, as shown in FIG. 1; alternatively, they could be in the shape of a ball, or a modified ball. It is preferred that the cleaning surfaces have a diameter that is approximately equal to, or greater than, the diameter of the mouse ball. This allows the cleaning surfaces 3 and 23 to approximate the movement of the mouse ball 32 within the interior ball cavity 31 and its rolling action upon the rollers 35 and thereby clean the rollers 35 by a rolling action. It is especially preferred that multiple rollers 35 are cleaned by a rolling action at the same.

In order to use the computer mouse device cleaner of the present invention, the computer mouse cover 33 with hole 34 on the underside of the mouse is removed and the mouse ball 32 is removed from the interior ball cavity 31. The first step of cleaning the inside of the mouse is to remove hair, lint and dust that may be attached to rollers 35 and mechanical parts inside of the mouse. This is done by inserting the first end 5 of the mouse cleaner 1 inside of the interior ball cavity 31 and rotating it to collect the contaminants on the first cleaning surface 3. The second step of cleaning the inside of the mouse is to remove residue from the rollers 35. This is done by inserting the second end 25 of the mouse cleaner 1 inside of the interior ball cavity 31 and rotating it to cause the rollers 35 to rotate and thereby "scrub" the surface of the rollers.

In an especially preferred method according to the present invention, a liquid solvent is also used to help clean the rollers 35. The liquid solvent is used to help loosen up hardened contaminants, and isopropyl alcohol is a preferred solvent. The solvent can be applied to the first cleaning surface 3 when it is initially inserted into the interior ball cavity 31. Alternatively, the first cleaning surface 3 can be used initially without any liquid solvent, then removed from the interior ball cavity 31 and cleaned, and then reinserted into the ball cavity 31 after the liquid solvent has been applied to its surface. The liquid solvent is then removed from the rollers 35 by the second cleaning surface 23 as it is scrubbing the rollers 35.

The purpose of the first cleaning surface 3 is to remove hair, lint or dust particles, or similar contaminants, from rollers 35 and mechanical parts 36 inside of the interior ball cavity 31. It has been found that a hook like surface, such as commonly used in a Velcro® fastener, is especially preferred for this task. Velcro® is a proprietary type of material that works through the use of two different surfaces that are generically referred to as a hook surface and a loop surface. The hook surface has a large number of small "hooks" that will grab or hook a large number of loops in the opposite surface to fasten the two surfaces together. There are many different ways to design a hook surface material, as well as many different grades of such materials available from different suppliers. The important characteristic, however the particular material is designed, is the mechanical ability to "grab" or "hook" something through a large number of small "hooks" . In the case of the present invention, it is the "hooks" of the hook surface that grab or snare the hair, lint or dust particles and allow such contaminants to be removed from inside of the interior ball cavity 31. It is this type of material that is being referred to herein as a "hook material" .

The purpose of the second cleaning surface 23 is to help remove residue from the rollers 35 and absorb any cleaning solution used with the first cleaning surface 3. The second cleaning surface 23 should be abrasive, but not so abrasive that it will be damaging to the rollers. The abrasiveness of the second cleaning surface 23 helps to polish the surface of the rollers 35. However, the second cleaning surface 23 should not leave any lint or residue on the rollers 35. Finally, the second cleaning surface 23 should be absorbent. Such a surface helps to pull dirt and contaminants into it, rather than leaving such materials on the surface of the rollers 35. It has been found that Scotch Brite® material is especially useful as the second cleaning surface 23.

The compressible materials 4 and 24 can be a foam, or other compressible materials. Although the use of compressible materials 4 and 24 is preferred, it is not required. The advantage of using such materials is that the cleaning surfaces 3 and 23 can be made in a shape that has a diameter that is greater than the diameter of the mouse ball, but they will still clean the rollers 35 and fit snugly against the rollers due to compression when either cleaning surface is simulating the movement of a mouse ball 32 against the rollers during cleaning. It has been found that it is especially preferred to use compressible materials 4 and 24 having a thickness of approximately one quarter of an inch.

In addition to cleaning the interior ball cavity 31, the mouse cleaner 1 can be used to clean the mouse ball 32. The ball cleaning surface 26 should be shaped so as to accommodate a rolling action of a mouse ball 32 within the ball cleaning surface 26 as shown in FIG. 4. In its most preferred form, the cleaning surface would be shaped so as to maximize the surface area of the ball cleaning surface 26 that is in contact with the mouse ball 32, to thereby allow the greatest amount of cleaning action to take place as the mouse ball 32 is rolled or rotated within the ball cleaning surface 26 during cleaning of the mouse ball 32. It is especially preferred that the ball cleaning surface 26 be made of the same material, with the same characteristics, as the second cleaning surface 23.

Accordingly, it will be readily apparent to those skilled in the art that still further changes and modifications in the actual concepts described herein can readily be made without departing from the spirit and scope of the invention as defined by the following claims.

What is claimed is:

1. A method for cleaning a computer mouse device with a computer mouse ball located in the interior ball cavity that has a plurality of mouse contact rollers and a plurality of mechanical parts, comprising:
    removing the computer mouse ball from the interior ball cavity;
    inserting a cleaning surface of a cleaning device into the interior ball cavity, the cleaning surface having a diameter approximately the same as or larger than the diameter of the mouse ball; and rotating the cleaning surface so as to cause one or more of the plurality of mouse contact rollers to roll and thereby be cleaned by the cleaning surface; and
    cleaning said mouse ball with a generally inwardly curved mouse ball cleaning surface of said cleaning device.

2. A method as recited in claim 1, wherein the cleaning surface is comprised of an abrasive, absorbent material.

3. A method as recited in claim 1, wherein the cleaning surface is comprised of a hook material.

4. A method as recited in claim 1, comprising the further step of:
    inserting a second cleaning surface of a cleaning device into the interior ball cavity the cleaning surface having a diameter approximately the same as or larger than the diameter of the mouse ball; and
    rotating the second cleaning surface so as to cause one or more of the plurality of mouse contact rollers to roll and thereby be cleansed by the second cleaning surface.

5. A method as recited in claim 4, wherein the cleaning surface is comprised of hook material and the second cleaning surface is comprised of an abrasive, absorbent material.

6. A method as recited in claim 5, wherein the second cleaning surface is inserted into the interior ball cavity after the cleaning surface has been inserted into the interior ball cavity and rotated so as to cause one or more of the plurality of mouse contact rollers to roll.

7. A method as recited in claim 5, comprising the further steps of applying a liquid cleaning solvent to the cleaning surface before it has been inserted into the interior ball cavity and absorbing the liquid cleaning solvent from one or more of the plurality of mouse contact rollers by the second cleaning surface.

8. A method as recited in claim 1, wherein said generally inwardly curved mouse ball cleaning surface includes:
    an abrasive, absorbent material; and the method further includes the step of
    reinserting the mouse ball into the interior ball cavity after cleaning the mouse ball.

9. A method as recited in claim 1, wherein a portion of said mouse ball cleaning surface is detachable.

10. A method as recited in claim 1, wherein said mouse ball cleaning surface is nested at least partially within said cleaning surface.

11. A method for cleaning a computer mouse device with a computer mouse ball located in an interior ball cavity that has a plurality of mouse contact rollers and a plurality of mechanical parts, comprising the steps of:
    removing the computer mouse ball from the interior ball cavity;
    inserting a first cleaning surface of a cleaning device into the interior ball cavity and rotating the first cleaning surface so as to permit removal of contaminants such as hair and dust from the plurality of mouse contact rollers and the plurality of mechanical parts;
    applying a liquid solvent to the first cleaning surface;
    reinserting the first cleaning surface into the interior ball cavity and rotating the first cleaning surface so as to cause the liquid solvent to come into contact with the plurality of mouse contacts;
    inserting an abrasive, absorbent cleaning surface of said cleaning device into the interior ball cavity and rotating the second cleaning surface so as to permit absorption of the liquid solvent from the plurality of mouse contacts, and
    cleaning said mouse ball with a generally inwardly curved mouse ball cleaning surface of said cleaning device.

12. A method as recited in claim 11, wherein said generally inwardly curved mouse ball cleaning surface includes:
    an abrasive, absorbent material; and said method further includes the step of
    reinserting the mouse ball into the interior ball cavity after cleaning said mouse ball.

13. A method as recited in claim 12, wherein a portion of said mouse ball cleaning surface is detachable.

14. A method as recited in claim 12, wherein said mouse ball cleaning surface is nested at least partially within said cleaning surface.

* * * * *